Dec. 20, 1966     G. E. WILCOX     3,293,436

DIRECTIONAL RADIATION DETECTOR MOUNTED ON A ROTATING TABLE

Filed Oct. 7, 1963

INVENTOR.
GEORGE E. WILCOX
BY
ATTORNEYS

United States Patent Office 3,293,436
Patented Dec. 20, 1966

3,293,436
DIRECTIONAL RADIATION DETECTOR
MOUNTED ON A ROTATING TABLE
George E. Wilcox, Doylestown, Pa., assignor to the
United States of America as represented by the Secretary of the Navy
Filed Oct. 7, 1963, Ser. No. 314,569
1 Claim. (Cl. 250—83.3)

The invention described herein may be manufactured and used by or for the Government of the United States of America for governmental purposes without the payment of any royalties thereon or therefor.

This invention relates to a detecting system for determining azimuth, range and elevation and more particularly to a detecting system employing nuclear techniques.

Detecting objects, such as landing fields, adjacent helicopters performing close order maneuvers, adjacent water vehicles, etc., at close range (60 to 1000 feet) during clear weather and daylight incur little difficulty. Visual contact obtains reasonably accurate information concerning azimuth, elevation and range. However, adverse weather conditions and night operations preclude the use of visual contact and recourse is had to optical, infrared, and radar systems for purposes of detection. These devices have been found ineffective since darkness, clouds and ground fog make visual and television methods undependable; the varying density of clouds and moisture, and spurious heat signals from the sun and other sources degrade infrared; and the short ranges complicate the radar problem.

It is an object of the present invention to provide a system for detecting an object or objects and for determining the range, azimuth and elevation thereof.

Another object of the present invention is to provide a detecting system employing radiation techniques for determining the range, elevation and azimuth of an object or objects.

Still another object of the present invention is to provide a detecting system which does not interfere with and is not affected by electronic equipment, is essentially nonjammable and nondetectable beyond the design range, and which utilizes a signal which undergoes negligible attenuation during propagation through an atmosphere varying in density, temperature and pressure.

Still a further object of the present invention is to provide a detecting system which is compact, simple, lightweight and inexpensive and one which will provide accurate information as to range, azimuth, and elevation under all conditions of weather and in darkness.

Various other objects and advantages will appear from the following description of an embodiment of the invention and the novel features will be particularly pointed out hereinafter in connection with the appended claim.

The present invention is concerned with an apparatus for detecting the range, azimuth and elevation of a radioactive source from a reference plane on the apparatus and for indicating the same to an operator.

Figure 1:
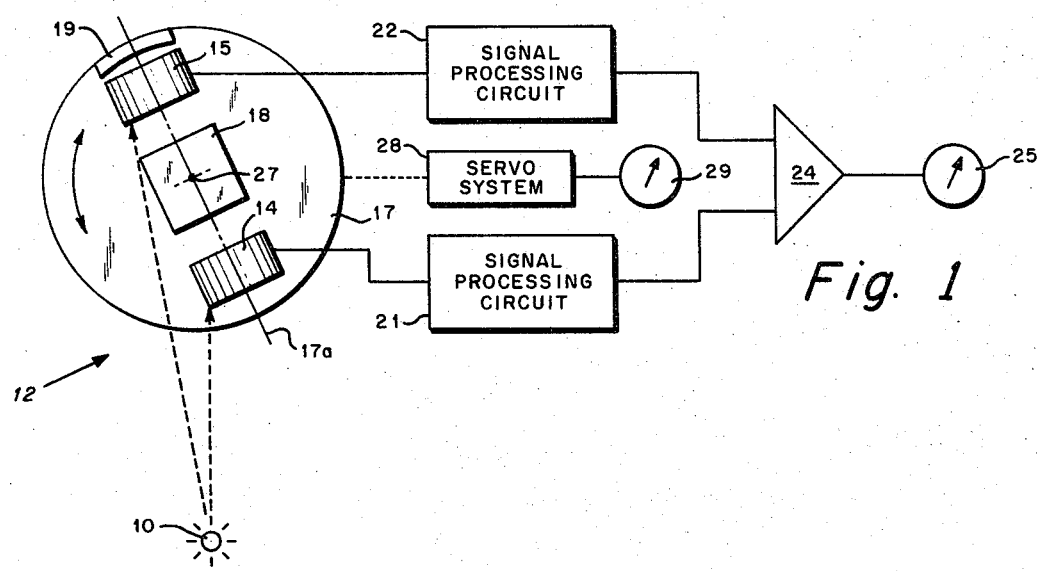
FIG. 1 is an embodiment of the present invention illustrated structurely and in block diagram with the detector being shown in plan.

Referring now to FIG. 1, an unshielded omnidirectional radio-active source indicated at 10 such as cobalt-60, a readily available gamma emitter with two distinctive response peaks of high energy and a half life of 5.3 years which thereby provides a stable source of gamma rays, is located on or at the object to be detected. The object may be a landing field, a fixed-wing aircraft, a helicopter, a water vehicle, etc. Detecting apparatus generally noted at 12 is located remote from the radioactive source and at a detecting station. The detecting station also may be a landing field, boat, adjacent fixed wing aircraft or helicopter. The apparatus 12 includes a front detector 14 and an eclipsed detector 15 and each may be any generally well known radiation detector device adapted to provide a quantative measurement of the received radiation such as the Geiger-Müller counter, ionization chamber, scintillation counter, or the like. The detectors 14 and 15 are mounted diametrically opposite on a rotatable platform 17 with a small shield 18 of lead or other appropriate material interposed between the detectors 14 and 15. An additional shielding segment 19 of lead or the like is secured to the platform at the rear of the eclipsed detector 15.

Detectors 14 and 15 are electrically coupled to signal processing circuits 21 and 22 where the signals from the detectors are converted from counts to filtered signals of corresponding value or magnitude. The circuits 21 and 22 are well known to those having ordinary skill in the art as evidenced by "Experimental Nucleonics" by Ernest Blender and George J. Goldsmith, published by Rinehart and Co., Inc., New York, 3d printing, June 1957. On pages 20 through 27 the authors describe typical schematic diagrams of the pre-amplifier, cathode follower, discriminator and pulse shaper, Schmitt trigger and flip-flop circuits which may be readily incorporated into the block diagram disclosed in FIG. 11.3 which describes means for counting the number of pulses from a radiation detector and displaying this information on a register. Therefore, further description here is considered unnecessary. The output signals from each of the signal processing circuits 21 and 22 are coupled to a differential amplifier 24 where the output signals from circuits 21 and 22 are subtracted and the resultant output is coupled to range meter or readout device 25.

The platform 17 rotates about vertical axis 27 and is mechanically coupled to a servo system indicated generally at 28, the servo system providing an output which is fed to bearing meter or readout device 29. Since the components of the servo system 28 are conventional and well known in the art, they have been depicted schematically by a block as their detailed description is considered to be unnecessary.

Describing now the operation of the system of FIG. 1, the platform 17 is caused to rotate about a vertical axis 27 and while rotating the detectors 14 and 15 sense the intensity of radioactive source 10. The platform 17 has a predetermined reference with respect to some point such as magnetic north or heading in a manner known to those having ordinary skill in the art so that the axis 17a passing through detectors 14 and 15 will have the deviation thereof from the reference point of magnetic north or heading reflected through servo system 28 in the bearing meter 29.

As the platform 17 rotates forward detector 14 senses the radiation of the gamma source 10 and produces a count rate which is proportional to the rate of disintegration of the source which is a known rate for any isotope and is proportional to the inverse square of the distance from the gamma ray source. This count rate is converted by circuit 21 to impulses or signals of corresponding value or magnitude to the quantative count received by the detector 14. The electronic impulses or signals produced as an output of circuit 21 are fed to amplifier 24 which simultaneously receives the output of signal processing circuit 22 which in turn receives a count rate from the detector 15. The output from processing circuit 22 is subtracted by differential amplifier 24 from the input received from processing circuit 21 and the resultant signal is applied to meter 25. It is understood that although meters 25 and 29 are shown for purposes of illustration, the use thereof should not be considered limiting but merely descriptive. It is further understood that displays such as a PPI display or automatic pilots may be interposed to receive the output from amplifier 24 without the exercise of invention. It is readily seen that as platform 17 rotates so that the axis 17a of the detectors approaches or aligns itself with the source 10 the front detector begins to read full intensity while the eclipsed detector reads much less due to the effect of shield 18 which precludes radiation from passing therethrough and being sensed by the eclipsed detector 15. When the difference signal between detectors 14 and 15 reaches a maximum, the two detectors are precisely in line with the source 10 and this signal is a function of the distance to that source. At the time that the maximum difference signal is obtained by readout 25, the readout 29 will reflect the azimuth of the source 10 with respect to the reference point-heading, magnetic north or the like.

The additional shield 19 provided at the rear of eclipsed detector 15 precludes a maximum signal from being received when the platform has rotated such that eclipsed detector 15 assumes the position of the front detector 14. Additionally the shield 19 precludes a zero reading at meter 25 if a second equal source of radiation, not shown, is 180 degrees from the radiation source 10.

It is understood that although platform 17 is illustrated and described as rotating about vertical axis 27 an additional platform or platform 17 itself may be oriented to place axis 27 in a horizontal plane. Subsequent rotation of the platform will provide a vertical sweep of detectors 14 and 15 and reception of range and azimuth information in a manner similar to horizontal sweeping. Elementary trigonometric principles will convert this information to a determination of elevation.

Since the eclipse method of FIG. 1 uses a difference signal between two detectors subjected to the same background it is unaffected by variations in this background except that the signal must rise above the background noise. This problem may be solved by conventional means known to those having ordinary skill in the art for raising the difference signal above the surrounding noise.

Figure 2:
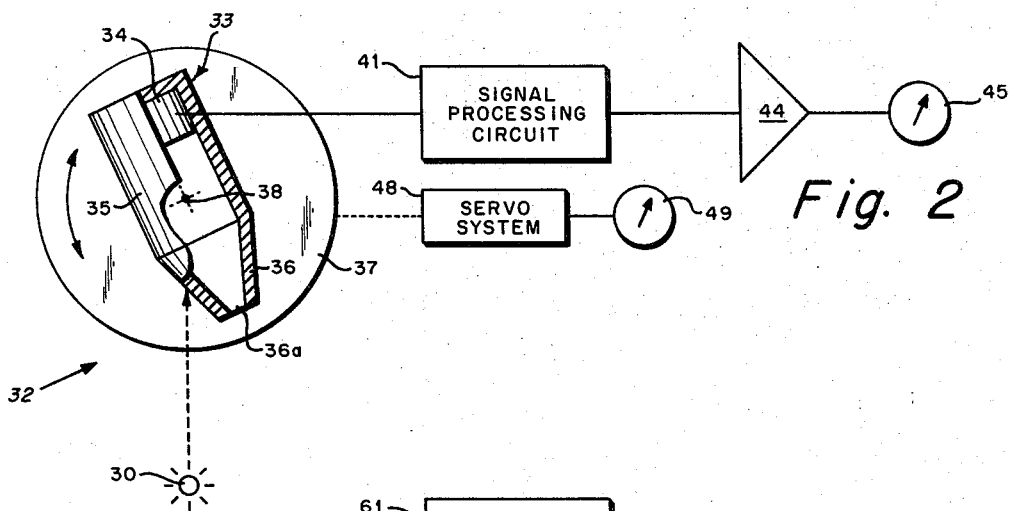
FIG. 2 is another embodiment of the present invention illustrated partially in section and partially in block diagram with the detector being shown in plan.

Referring now to FIG. 2, there is shown a source of gamma radiation 30 and a detecting apparatus 32, each of which is located similarly to the radioactive source 10 and detecting apparatus 12 of the embodiment of FIG. 1. The collimated detector or scanner portion 33 of apparatus 32 includes a detector similar to detectors 14 and 15 housed within a cylindrical container 35 of a shielding substance such as lead or the like. The outer or open end of the container 35 is formed with a frontal portion 36 having a vertical slot 36a formed therein and communicating with the detecting element 34. The resultant effect of the cylindrical container 35 and the frontal portion 36 is to provide a single collimated detector which is used as a scanner. This scanner 33 is secured to platform 37 which in turn is rotatable about a vertical axis 38. The detector 34 is coupled to a signal processing circuit 41 which in turn has the output thereof providing the input for amplifier 44. The readout 45 indicates the output of the amplifier 44 in terms of useful and readable information which is the range of the source 30 from the scanner 33. It is again understood that the output from amplifier 44 may also be used as an input to a PPI display, an automatic pilot system or the like.

In a manner similar to FIG. 1, the servo system 48 and meter 49 are arranged to provide a reading indicative of the azimuth or bearing of the scanner 33 with reference to some fixed point such as heading or magnetic north.

In operation, when the collimated detector or scanner 33 faces in a direction remote from the source of radiation 30, the lead shield 35 absorbs the radiation and detecting element 34 receives little or no radiation. As the platform 37 rotates and the slot 36a and detector 34 align themselves with the radiation source 30, the detector 34 provides a maximum signal and the count rate so provided is a measure of the distance of the detector from the source 30. As in FIG. 1, above, when this maximum reading is obtained at readout 45, meter 49 will provide the azimuth information.

Variable high background radiation resulting from jamming attempts, fallout accumulation, or radioactive mineral deposits, can present a serious problem to the embodiment of FIG. 2 since it depends upon a single detector for range information. It is understood that to eliminate this problem, gating or discriminating devices known and used by those skilled in the art may be employed.

In this embodiment, as in FIG. 1, the platform 37 may be oriented so that detector 34 will provide information as to the elevation of source 30.

Figure 3:
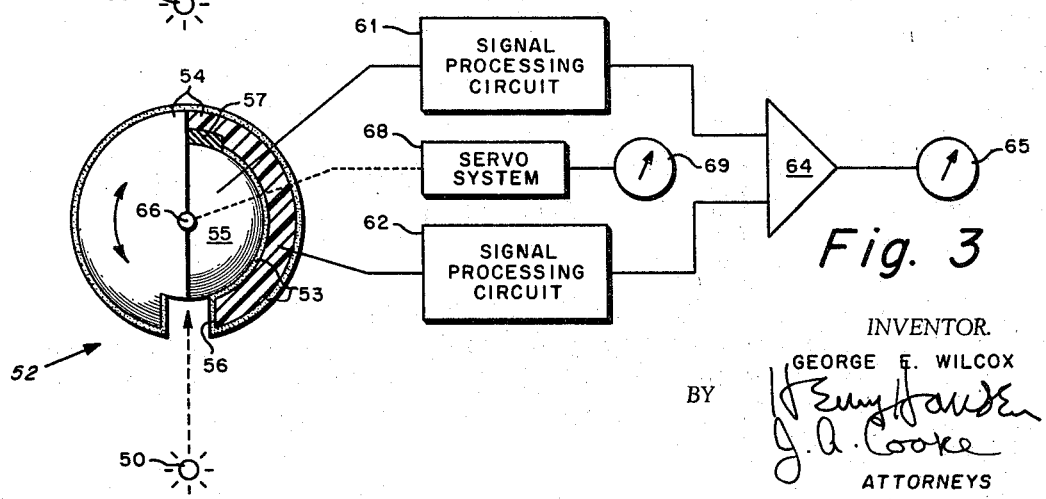
FIG. 3 is still another embodiment of the present invention illustrated partially in section and partially in block diagram with the detector being shown in plan.

In FIG. 3, a source of radiation 50 is located in terms of azimuth and range by detecting apparatus 52 which includes a pair of concentric spherical detectors 54 and 55, with inner detector 55 housed within outer detector 54. Each of the detectors 54 and 55 are constructed of a plastic scintillating material of the kind known and used in the art and have a layer of black paint 53 interposed between the inner facing surfaces and coating the outer surface of detector 54. The outer spherical detector 54 has a vertical slot 56 formed therein similar to the slot formed in the collimated detector 33 of FIG. 2. Diametrically opposite the slot 56 is a shield 57 of lead or other appropriate material secured to the inner spherical detector 55 to preclude the radiant energy received by detector 55 by way of slot 56 from passing through to the outer detector 54. Detector 55 is coupled to a signal processing circuit 61 which in turn produces an output signal representative of the count rate received by the detector and which is applied to differential amplifier 64. Similarly, outer detector 54 is coupled to the signal processing circuit 63 the output of which is representative of the count rate received by outer detector 54 and which additionally is fed to amplifier 64. The output of amplifier 64 is coupled to readout device 65.

Detectors 54 and 55 are secured to a vertical pin 66 which is rotatable in bearings not shown. The pin 66 carries detectors 54 and 55 in a manner that the slot 56 acts as a scanner and sweeps in a horizontal plane of vertical dimension determined by the vertical height of the slot 56. Vertical pin 66 has a mechanical connection to the servo system 68 in a manner similar to the connection of the platforms and servo systems of the prior embodiments. The servo system, therefore, provides an output to the azimuth meter 69 which is indicative of the position of slot 56 with respect to the reference point such as heading or magnetic north.

In operation, when the slot 56 is facing a direction other than towards the source of radiation 50, the radiation will pass through the outer detector 54 providing an input to the signal processing circuit 61, the output of which is coupled to amplifier 64. The radiation will then pass through inner detector 55 also providing a counter rate input to signal processing circuit 62 which in turn will provide an input to the amplifier 64 in the form of a voltage signal. Amplifier 64 will subtract the signal received from the outer detector 54 from the signal received from the inner detector 55 and will provide readout 65 with an output indicative of the difference between the signals. It is seen that when the slot formed in the outer detector 54 is aligned with the source of radiation 50 the radiation will be detected by the inner detector 55 and will not pass through to outer detector 54 by reason of the lead shield 57 interposed therebetween. Therefore, the inner detector will read the full intensity of radiation while the outer detector reads much less. The maximum difference signal will indicate that the slot is in precise alignment with the source, the signal thereby produced being a function of the distance to the source. Additionally, a reading of readout 69 at the time when the meter 65 reads maximum will provide the azimuth of the radiation source.

As in the embodiment of FIG. 1, any background radiation or noise will be equally detected by outer and inner detectors 54 and 55 and therefore will be balanced out.

In order to obtain elevation information, the spherical detectors are oriented so that pin 66 lies in a horizontal plane. Subsequent rotation of the pin 66 will cause slot 56 to sweep vertically and provide range and azimuth information which is converted to elevation by principles of trigonometry.

Obviously many modifications and variations of the present invention are possible in the light of the above teachings. It is therefore to be understood that within the scope of the appended claim, the invention may be practiced otherwise than as specifically described.

What is claimed is:

A detecting system for determining the range of a radioactive object and the angular location thereof from a predetermined reference axis, comprising:

a source of radiation of known disintegration rate, a pair of spherical detecting elements one of which encapsulates the other remote from said source for measuring the intensity of said source, the outer spherical detector having a slot formed therethrough providing communication with the inner detector, the directional facing of said slot being referenced with respect to said predetermined reference axis, means connected to said spherical detecting elements for rotating said elements in a horizontal plane and for providing an output which is indicative of the angular position of said source from said elements, shielding means interposed between said inner and outer detectors in alignment with and diametrically opposite said slot for precluding the radiant energy from said source entering said slot from passing through to said outer detector, circuit means coupled to each of said detectors for converting the count rate received by said detectors to a voltage signal representative of the count rate, differential circuit means receiving said voltage signals and providing an output signal representative of the difference thereof, the output of said differential circuit means receiving a maximum when one of said detectors receives the full intensity of said source and the other of said detectors is totally shielded from said source by said shielding means, and indicator means adapted to receive the difference signal for indicating the distance of said source from said detecting elements when said slot is in alignment with said source.

References Cited by the Examiner

UNITED STATES PATENTS

| | | | |
|---|---|---|---|
| 2,830,187 | 4/1958 | Scherbatskoy | 250—83.3 |
| 2,836,726 | 5/1958 | Rich | 250—83.6 |
| 2,992,330 | 7/1961 | Cooper | 250—71.5 |
| 3,028,493 | 4/1962 | Takahashi | 250—83.3 |
| 3,047,721 | 7/1962 | Folsom et al. | 250—71.5 X |
| 3,071,689 | 1/1963 | Scherbatskoy | 250—71.5 X |
| 3,091,463 | 5/1963 | Cohen | 250—71.5 |
| 3,167,652 | 1/1965 | Weisbrich | 250—71.5 |

RALPH G. NILSON, *Primary Examiner.*

JAMES W. LAWRENCE, WALTER STOLWEIN
*Examiners.*

S. ELBAUM, *Assistant Examiner.*